United States Patent [19]

Kurata et al.

[11] Patent Number: 5,392,372
[45] Date of Patent: Feb. 21, 1995

[54] OPTICAL COUPLING EQUIPMENT FOR AN OPTICAL SEMICONDUCTOR AND AN OPTICAL FIBER

[75] Inventors: Kazuhiko Kurata; Hiroshi Honmou, both of Tokyo, Japan

[73] Assignee: NEC Corporation, Tokyo, Japan

[21] Appl. No.: 126,769

[22] Filed: Sep. 27, 1993

[30] Foreign Application Priority Data

Sep. 25, 1992 [JP] Japan .................. 4-256656

[51] Int. Cl.⁶ .................. G02B 6/00; G02B 6/36
[52] U.S. Cl. .................. 385/88; 385/52; 250/227.11
[58] Field of Search .................. 385/88–94, 385/31, 39, 51, 53, 55, 52, 61, 66; 250/227.11, 227.25

[56] References Cited

U.S. PATENT DOCUMENTS

| | | | |
|---|---|---|---|
| 4,107,242 | 8/1978 | Runge | 385/80 X |
| 4,474,429 | 10/1984 | Yoldas et al. | 385/88 X |
| 4,512,630 | 4/1985 | Runge | 385/66 X |
| 4,678,271 | 7/1987 | Beaulieu | 385/88 X |
| 4,772,086 | 9/1988 | Bellerby et al. | 385/88 X |
| 4,779,946 | 10/1988 | Pimpinella et al. | 385/88 |
| 4,815,807 | 3/1989 | Kaneko et al. | 385/33 |
| 5,048,919 | 9/1991 | Ladany | 385/51 X |
| 5,119,451 | 6/1992 | Wills et al. | 385/91 X |
| 5,155,791 | 10/1992 | Hsiung | 385/130 X |
| 5,307,438 | 4/1994 | Bilkadi et al. | 385/15 X |

OTHER PUBLICATIONS

Kuwahara et al., "Efficient coupling from semiconductor lasers into single-mode . . . ends", Applied Optics, vol. 19, No. 15, Aug. 1, 1980, pp. 2578–2583.

Primary Examiner—Akm E. Ullah
Attorney, Agent, or Firm—Sughrue, Mion, Zinn, Macpeak & Seas

[57] ABSTRACT

Optical coupling equipment of the invention for an optical semiconductor and an optical fiber comprises a optical semiconductor, an optical fiber optically coupled to the semiconductor, and a refraction index matching substance filling the space between the semiconductor and the fiber. The refraction index matching substance has a refraction index greater than 1 and smaller than the refraction index of the core of the fiber. The optical distance between the ends of the semiconductor and the fiber with the ends of convex tip changes in association with the refraction index of the refraction index matching substance. In the differences in refraction index between the core of the fiber, as measured on the convex tip, and the outside decreases, the position of the focus of the convex tip changes. Furthermore, if the substances exists outside the active layer, the radiation angle of the laser diode also decreases. As a result, the distance between the facing ends which provides the highest coupling efficiency increases, compared to the equipment lacking the substance.

11 Claims, 8 Drawing Sheets

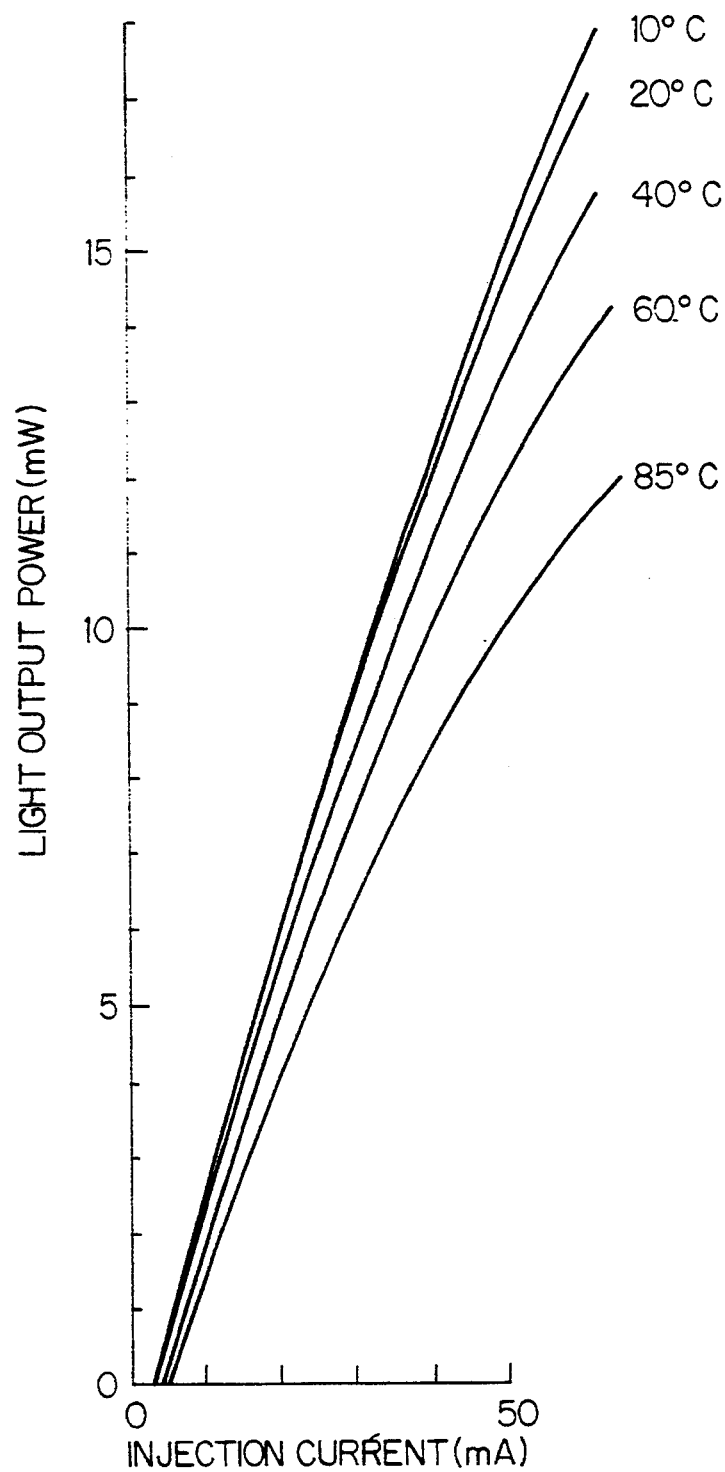

OPTICAL COUPLING EQUIPMENT FOR AN OPTICAL SEMICONDUCTOR AND AN OPTICAL FIBER

BACKGROUND OF THE INVENTION

The present invention relates to equipment for optically coupling a semiconductor and an optical fiber for optical fiber communication.

Optical coupling equipment for coupling radiation light from a semiconductor laser diode to an optical fiber or coupling radiation light from an optical fiber to a photodetector is indispensable in constructing an optical fiber communication system. Particularly, to couple radiation light from a semiconductor laser diode efficiently to a single mode fiber, the prerequisite is that the laser diode and fiber be positioned with extremely high accuracy. On the other hand, to couple a semiconductor laser diode and a single mode fiber, equipment which is simple and miniature and feasible for quantity production is needed.

Optical coupling from a semiconductor laser diode to an optical fiber may be implemented by, e.g., equipment using an optical fiber having a hemispherical end, as proposed by Kuwahara in APPLIED OPTICS, Vol. 19, No. 15, 1980, pp. 2578–2583. The hemispherical end or tip is configured by chemical etching or similar technology and on which light is incident. The optical fiber with such a tip is located in the vicinity of the radiation end of a semiconductor laser diode, so that radiation light from the laser diode may be coupled to the fiber. The hemispherical end of the fiber condenses the radiation light to enhance coupling efficiency. In addition, such coupling equipment is miniature and simple since it does not need a lens.

However, the problem with the coupling equipment using a fiber having a hemispherical tip is that the laser diode and fiber have to be positioned with high accuracy, compared with equipment using a lens. For example, to couple a semiconductor laser diode and a single mode fiber, the positional deviation of the fiber and the radiating portion of the laser diode relative to each other should be about less than 0.5 μm in the direction perpendicular to the optical axis and less than several microns in the direction parallel to the optical axis. Generally, the tolerance of the outside diameter of a single mode fiber and the concentricity of the core each has irregularity of about 1 μm. Also, a mount for mounting the laser diode and fiber involves errors. Therefore, even when the laser diode and fiber are mechanical positioned on the mount by use of marks or similar references, they are displaced relative to each other and, therefore, fail to set up optimum optical coupling. It follows that optical coupling has to be set up by adjusting the position while monitoring the radiation light from the laser diode. This kind of scheme, however, requires the laser diode to oscillate and results in time-consuming adjustment. Moreover, even if the laser diode and fiber are brought to and fixed at optimum positions, they are displaced due to varying ambient temperature and aging, degrading coupling efficiency.

Further, an optical loss ascribable to Fresnel reflection occurs on the hemispherical tip of the fiber. Since the hemispherical tip is located in close proximity to the laser diode, the Fresnel reflection light from the hemispherical tip is incident roan active layer included in the laser diode. As a result, the oscillation of the laser diode becomes unstable to obstruct stable communication.

The influence of the Fresnel reflection light on the end of the fiber is a problem not only on the transmission side but also on the reception side. Specifically, when the radiation from the fiber is coupled to the photodetector, the Fresnel reflection light on the end of the fiber or that of the photodetector sometimes results in echoes due to multireflection on the transmission path.

Besides, conventional equipment for coupling a semiconductor laser diode and an optical fiber needs an automatic power control (APC) circuit for maintaining the light output from the fiber constant. Specifically, the light output power of a semiconductor laser diode falls when the ambient temperature is high. The APC circuit controls an injection current by monitoring the radiation light from the rear end of the laser diode, such that the output light remains constant.

SUMMARY OF THE INVENTION

A primary object of the present invention is to ease the permissible positioning accuracy requirement in optical coupling equipment for a semiconductor laser diode and an optical fiber. Also, the present invention provides optical coupling equipment for an optical semiconductor and an optical fiber which reduces the optical loss due to Fresnel reflection light on the end of the fiber and insures stable operation of a semiconductor laser diode.

Another object of the present invention is to provide optical coupling equipment for an optical semiconductor and an optical fiber which corrects, without resorting to an APC circuit, a change in the light output power of a laser diode ascribable to varying temperature to reduce the change in the light output from the fiber.

Optical coupling equipment for an optical semiconductor and an optical fiber of the present invention comprises an optical semiconductor, an optical fiber optically coupled to the semiconductor, and a refraction index matching substance filling the space between the semiconductor and the fiber.

The refraction index matching substance has a refraction index greater than 1 and smaller than the refraction index of the core of the fiber. The refraction index of the refraction index matching substance decreases substantially linearly with an increase in temperature.

BRIEF DESCRIPTION OF THE DRAWINGS

The above and other objects, features and advantages of the present invention will become more apparent from the following detailed description taken with the accompanying drawings in which:

FIG. 12 is a graph indicative of light output power of a semiconductor laser diode used for experiment and associated with injection currents at various temperatures.

DESCRIPTION OF THE PREFERRED EMBODIMENT

Figure 1:
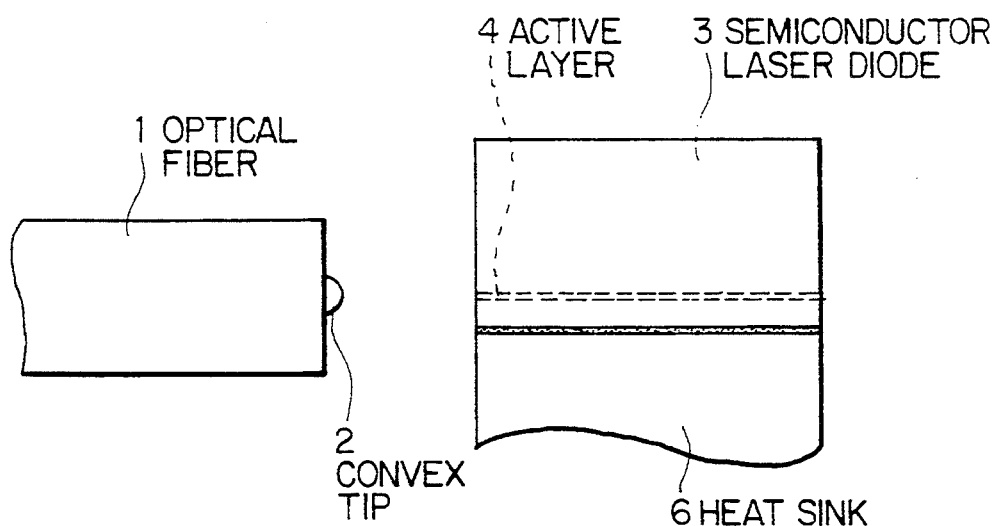
FIG. 1 is a vertical section of conventional equipment for optically coupling an optical semiconductor and an optical fiber.

To better understand the present invention, a brief reference will be made to conventional equipment for coupling an optical semiconductor element and an optical fiber, shown in FIG. 1. As shown, a semiconductor laser diode 3 is soldered to a heat sink 6 which is provided on a mount, not shown. The laser diode 3 includes an active layer 4. An optical fiber 1 has the end thereof cut in a mirror configuration and includes a core provided with a hemispherical end by chemical etching and heating. The fiber 1 is affixed to the mount and positioned such that the optical axis of light issuing from the active layer 4 of the laser diode 3 and the optical axis of the fiber 1 align with each other. The light from the active layer 4 is condensed by the hemispherical end 2 and coupled to the core of the fiber 1. This kind of coupling arrangement has various problems as discussed earlier.

Figure 2:
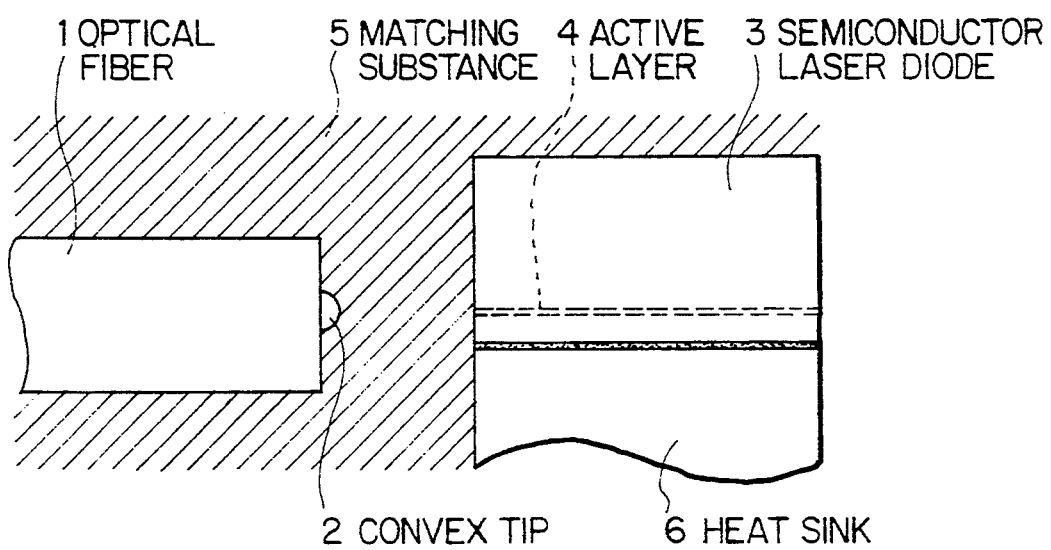
FIG. 2 is a vertical section showing equipment for optically coupling an optical semiconductor and an optical fiber and embodying the present invention.

Referring to FIG. 2, optical coupling equipment embodying the present invention will be described. As shown, a package, not shown, accommodating a semiconductor laser diode 3 and an optical fiber 1 is filled with a refraction index matching substance 5. The laser diode 3 includes an active layer 4 while the fiber 1 has a hemispherical end 2. The refraction index matching substance 5 distinguishes the embodiment from the conventional coupling equipment. The substance 5 has a smaller refraction index than the fiber 1 in order that light issuing from the active layer 4 of the laser diode 3 may be condensed onto the core. Also, the substance 5 has a greater refraction index than air to reduce reflections at the end of the fiber 1. In the illustrative embodiment, the refraction index of the substance 5 lies in the range of from 1.28 to 1.31. The substance 5 may be implemented by perfluorocarbon or perfluorotrialkylamin by way of example. The perfluorotrialkylamin may comprise a fluoric resin including a composition represented by the formula $(C_5F_{11})_3N$ or a composition represented by the formula $(C_4F_9)_3N$. In both of the conventional equipment and embodiment, the fiber 1 is constituted by a single mode fiber having a field radius of 10 $\mu$m and an outside diameter of 125 $\mu$m. At the hemispherical end 2, the core of the fiber 1 protrudes about 5 $\mu$m and has a radius of curvature of 5 $\mu$m.

The coupling characteristic of the equipment of the present invention and that of the conventional equipment as determined by simulation are as follows. In accordance with the present invention, the refraction index matching substance 5 filling the space between the end of the active layer 4 of the laser diode 3 and the convex tip 2 of the fiber 1 changes the optical distance between them and, therefore, the coupling characteristic between the diode 3 and the fiber 1.

Figure 3A:
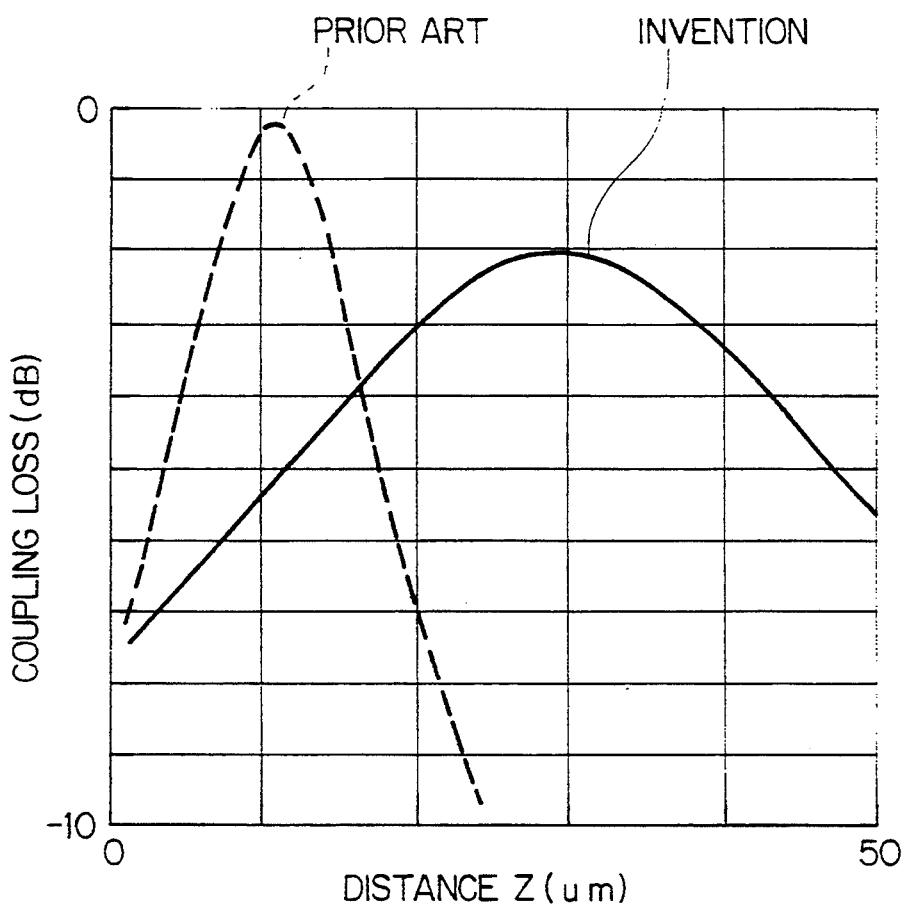
FIG. 3 is a graph comparing the equipment of the present invention and the conventional equipment with respect to a relation between the distance between the laser diode and the fiber in the direction parallel to the optical axis and the coupling loss, as determined by simulation.
Figure 3B:
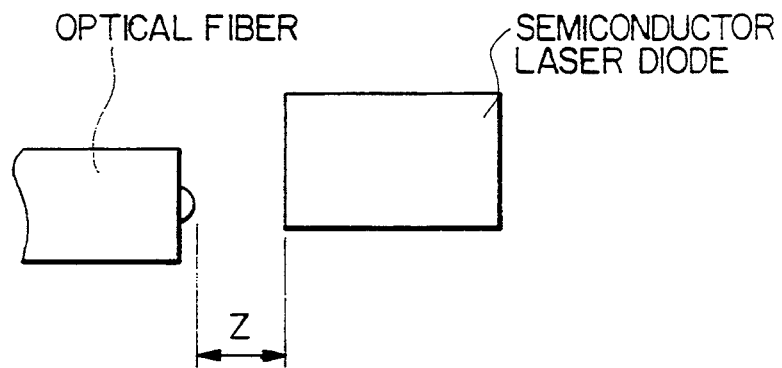

FIG. 3 compare the equipment of the present invention and the conventional equipment with respect to a relation between the distance between the laser diode and the fiber in the direction parallel to the optical axis and the coupling loss, as determined by simulation. For the simulation, the equipment of the present invention included a refraction index matching substance whose refraction index was 1.275, while the conventional equipment did not include it. It is to be noted that the half width value of the laser diode 3 is 25 degrees in both of the directions perpendicular to and parallel to the active layer, and that the radiation light is approximated by Gauss distribution. As shown in FIG. 3, in the conventional equipment, when the distance between the laser diode 3 and the fiber 1 is 10 $\mu$m, the coupling loss is about 0.2 dB; the coupling efficiency is highest. On the other hand, when the refraction index matching substance 5 exists between the laser diode 3 and the fiber 1, the optical distance between the ends of the diode 3 and fiber 1 changes in associated with the refraction index of the substance 5. In addition, since the difference in refraction index between the core of the fiber 1, as measured on the convex tip 2, and the outside decreases, the position of the focus of the convex tip 2 changes. Furthermore, if the substance 5 exists outside the active layer 4, the radiation angle of the laser diode 3 also decreases. As a result, the distance between the facing ends which provides the highest coupling efficiency increases, compared to the equipment lacking the substance 5. Specifically, when the refraction index is 1.275, the distance which minimizes the coupling loss is about 30 $\mu$m.

Regarding the coupling loss which provides the highest coupling efficiency, it is about 0.2 dB in the conventional equipment and about 2 dB in the equipment of the present invention, meaning a fall by about 2 dB. However, the refraction index matching substance 5 reduces the change in the coupling loss in the direction parallel to the optical axis, compared to the equipment lacking it. With the illustrative embodiment, a permissible displacement about 2.5 times greater than that of the conventional equipment is achievable. It follows that the equipment of the present invention allows a minimum of change in coupling loss to occur even when the position is deviated in the direction parallel to the optical axis, although lowering the coupling efficiency at the optimum position.

Figure 4:
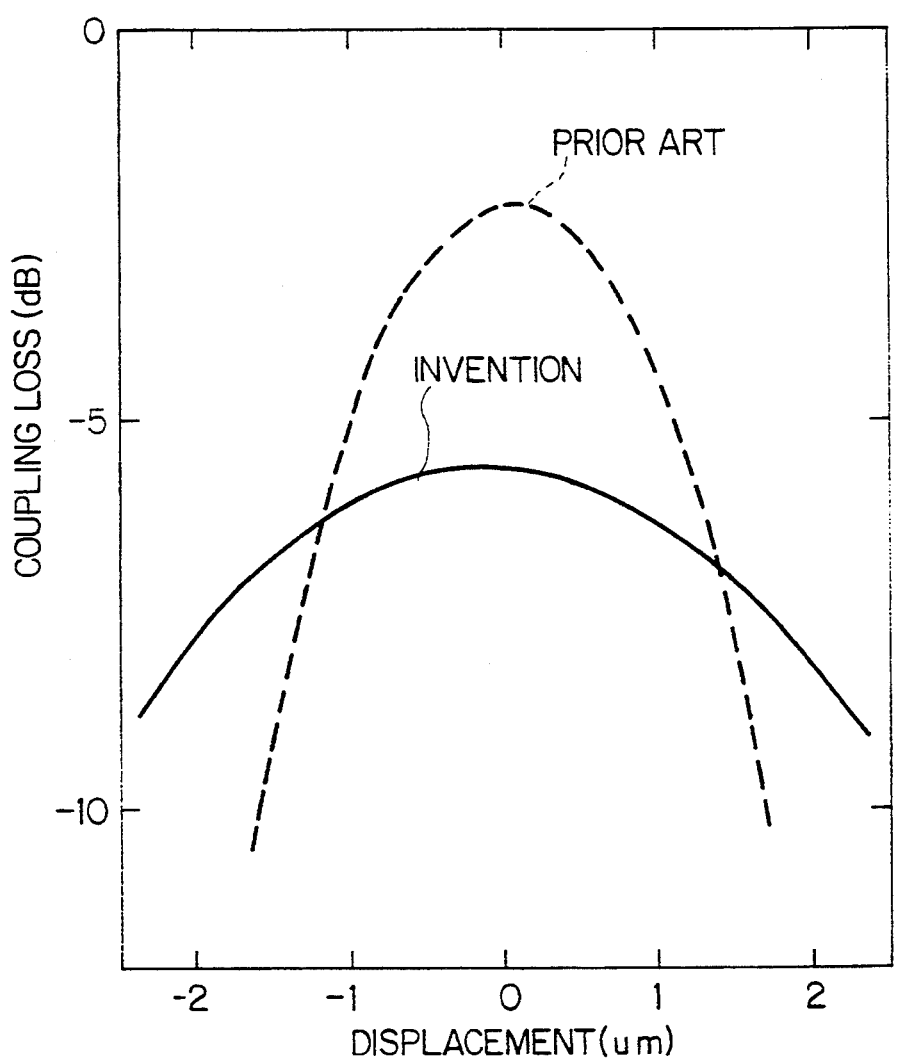
FIG. 4 is a graph also comparing the equipment of the present invention and the conventional equipment with respect to a relation between the distance between the laser diode and the fiber in the direction perpendicular to the optical axis and the coupling loss, as determined by simulation.

FIG. 4 is a graph comparing the equipment of the present invention and the conventional equipment with respect to a relation between the displacement in the direction perpendicular to the optical axis of the laser diode and fiber and the coupling efficiency, as determined by simulation. The radiation angle of the laser diode 3 is 30 degrees. As the graph indicates, when the refraction index matching substance 5 is absent, the permissible displacement from the position where the coupling is optimum to the position where the coupling loss falls 2 dB is less than 1 $\mu$m. By contrast, when the substance 5 is present, the permissible displacement is about 2 $\mu$m which is about twice the conventional one.

With the conventional equipment, it is difficult to couple the laser diode 3 and fiber 1 without positional adjustment. The equipment of the present invention noticeably broadens the permissible displacement range in both the direction parallel to the optical axis and the direction perpendicular thereto. Moreover, such a permissible displacement range allows the laser diode 3 and fiber 1 to be coupled without resorting to fine adjustment. Hence, the equipment can be assembled only if the laser diode 3 and fiber 1 are mechanically positioned and affixed, enhancing productivity to a significant degree. In addition, once the equipment is assembled, the coupling loss changes little even if the relative position of the laser diode 3 and fiber 1 is changed due to a change in ambient temperature or similar factor.

Further, the refraction index matching substance 5 filling the gap between the laser diode 3 and fiber 1 reduces the difference in refraction index between the core of the fiber 1 and the outside, as mentioned earlier. This reduces Fresnel reflection light at the end of the core 1 and, therefore, the reflection light to the active layer 4 of the laser diode 3, thereby insuring the stable operation of the laser diode 3.

Figure 5:
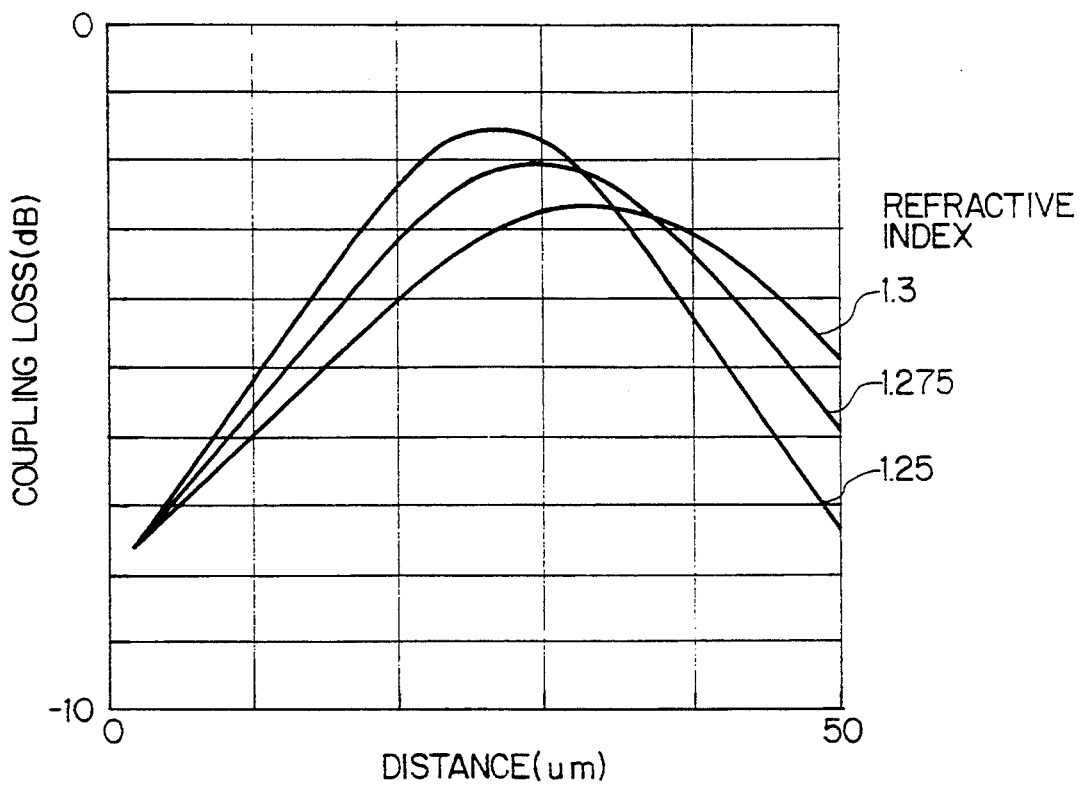
FIG. 5 is a graph indicative of a relation between the laser diode and the fiber and the coupling loss achievable with the equipment of the present invention and determined by simulation by changing the refraction index of a refraction index matching substance.

In accordance with the present invention, even when the ambient temperature changes, the output light can be maintained substantially constant without resorting to an APC circuit. FIG. 5 shows a relation between the distance between the laser diode 3 and the fiber 1 and the coupling loss particular to the equipment of the present invention and determined by simulation by changing the refraction index of the refracting index matching substance. As shown, in the equipment using the refraction index matching substance, the coupling characteristic changes in association with the refraction index. Specifically, when a refraction index matching substance having a small refraction index is used, the distance between the laser diode and the fiber which provides the optimum coupling efficiency, as well as the coupling loss, is small. The above-mentioned distance and coupling loss increase with an increase in refraction index. Generally, as the temperature rises, the threshold current of a semiconductor laser diode and a differential quantum efficiency decrease. It follows that coupling loss at high temperature can be reduced if the laser diode is located at a position which will set up optimum coupling at high temperature beforehand, and if use is made of a refraction index matching substance whose refraction index decreases with an increase in temperature. As a result, when the light output power of the laser diode changes due to a change in ambient temperature, the coupling loss is changed to correct the output light.

Figure 6:
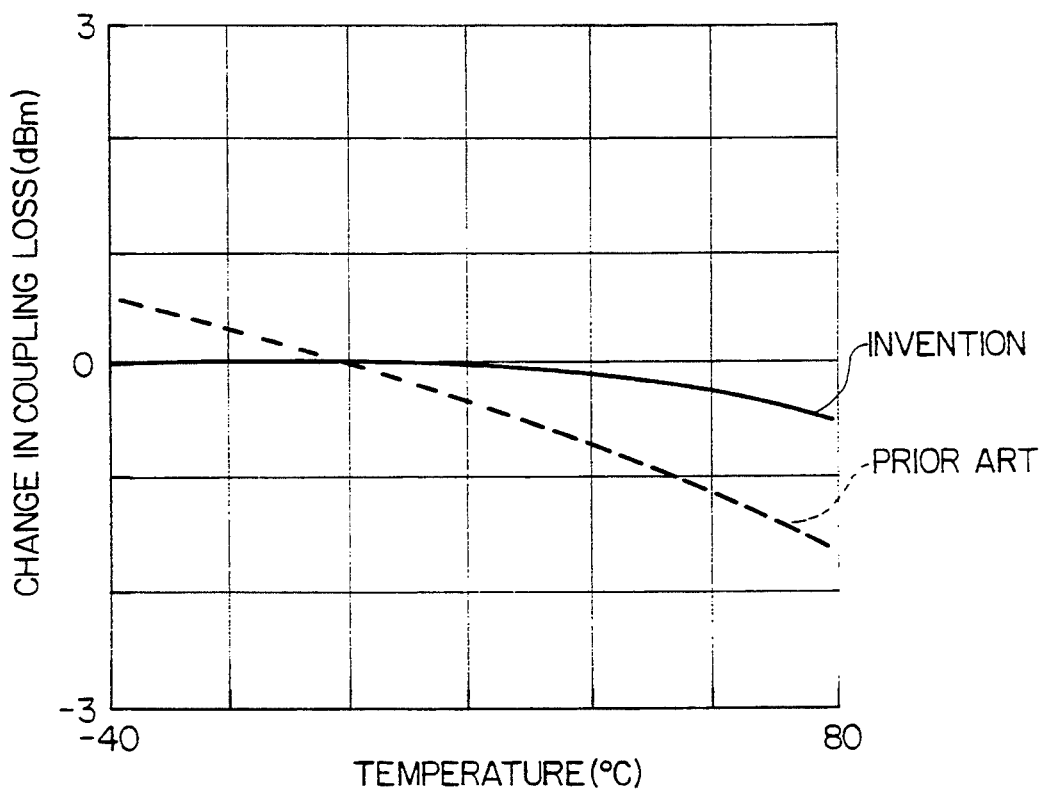
FIG. 6 is a graph comparing the equipment of the present invention and the conventional equipment with respect to a relation between the ambient temperature and the change in coupling loss, as determined by simulation.

When a semiconductor laser diode is coupled to a single mode fiber, the output light of the fiber changes with a change in ambient temperature, as shown in FIG. 6. The graph of FIG. 6 was derived from simulation. For the simulation, the refraction index of the refraction index matching substance was caused to change at a rate of $-3.5\times10^{-4}/°$ C., while the output light was caused to decrease at a rate of $-0.036$ mW/° C. relative to the increase in the temperature of the laser diode. As the graph indicates, when the refraction index matching substance is absent, the output light changes about 2 dB in response to a temperature change in the range of from $-40°$ C. to $+80°$ C. By contrast, when such a substance is used, the output light does not change more than 1 dB. In this manner, the present invention is capable of maintaining the output light of the fiber substantially constant without controlling the injection current by an APC circuit.

Figure 7:
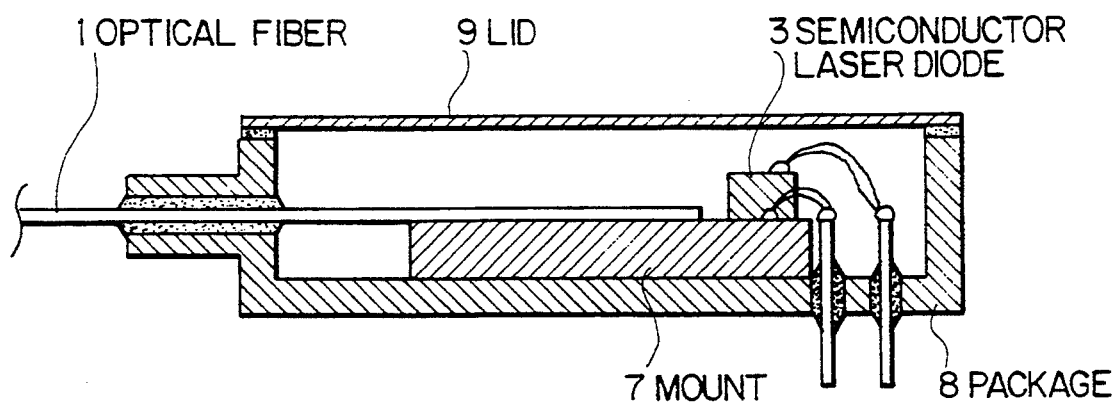
FIGS. 7 and 8 are vertical sections respectively showing a semiconductor laser diode module implemented with the conventional equipment and a semiconductor laser diode module implemented with the equipment of the present invention.
Figure 8:
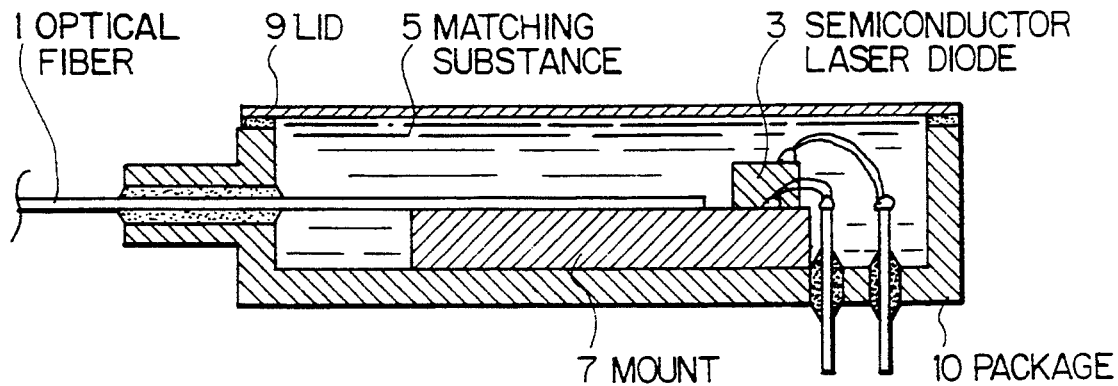

The result of evaluation of a semiconductor laser diode module implemented with the coupling equipment of the present invention will be described. FIGS. 7 and 8 respectively show semiconductor laser diode modules using conventional coupling equipment and the coupling equipment of the present invention.

The optical fiber 1 is a single mode fiber having a core diameter of 10 $\mu$m and an outside diameter of 125 $\mu$m. The end of the fiber 1 is cut in a mirror configuration. Further, the tip of the fiber 1 is chemically etched by hydrofluoric acid and then melted by heat to form the hemispherical lens-like convex end 2. The fiber 1 is affixed by a resin in a V-shaped groove formed in the surface of a mount 7 by chemical etching. On the other hand, the semiconductor laser diode 3 is constituted by an InGaAsP semiconductor and provided with a wavelength of 1.3 $\mu$m and a radiation angle of about 29 degrees. The laser diode 3 is soldered to the mount 7. A particular mark is provided on the surface of the mount 7 for positioning the laser diode 3 on the mount 7. The laser diode 3 and fiber 1 are mechanically positioned such that the optical axis of the active layer 4 of the laser diode 3 and that of the core of the fiber 1 align with each other. The mount 7 carrying the laser diode 3 and fiber 1 is accommodated in a package 8.

The equipment of the present invention filled with the refraction index matching substance and the conventional equipment lacking such a substance were evaluated with respect to coupling characteristic. The result of evaluation is as follows.

Figure 11:
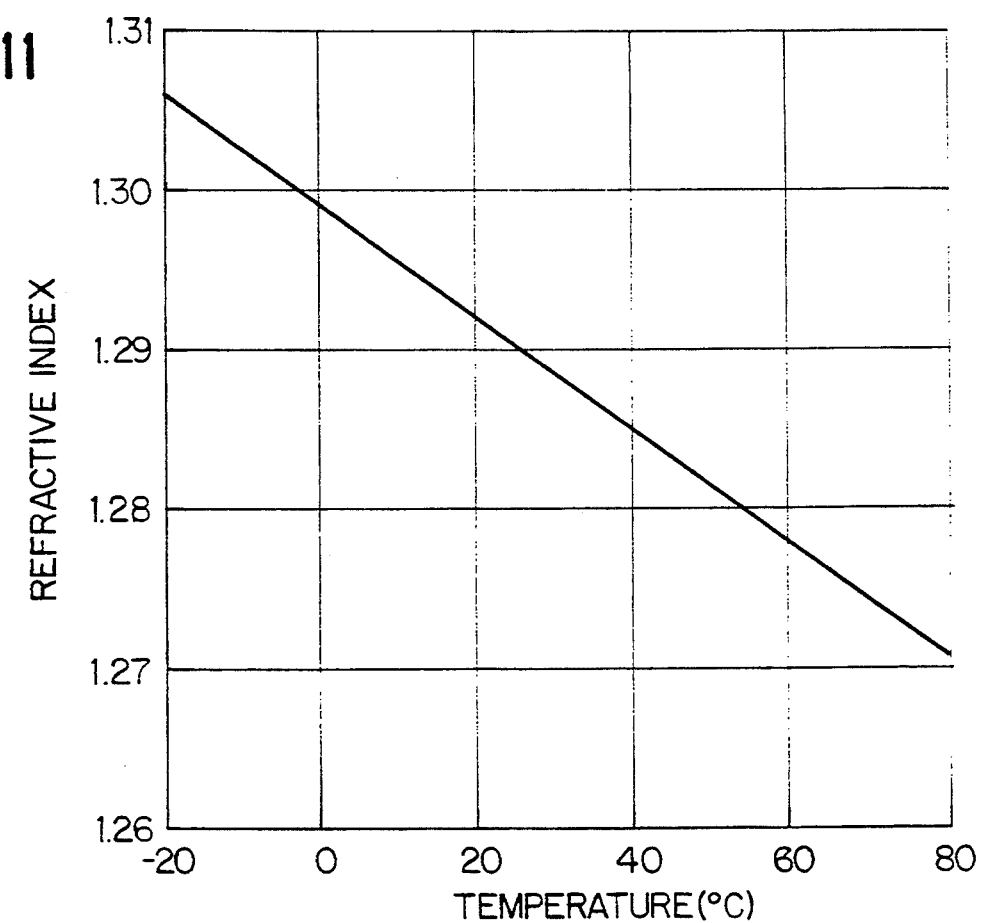
FIG. 11 is a graph representative of the temperature dependency of the refraction index matching substance included in the equipment of the present invention.

To begin with, in the equipment of the present invention, the package 8 is filled with the refraction index matching substance 5 implemented by perfluorotrialkylamin which has a refraction index of 1.29 at room temperature. A lid 9 hermetically seals the package. FIG. 11 plots the temperature dependency of the refraction index of perfluorotrialkylamin. As shown, the refraction index changes at a rate of $\Delta n=-3.5\times10^{-4}/°$ C. and sequentially decreases with the increase in temperature. In the temperature range of from $-20°$ C. to $+80°$ C., the refraction index substantially linearly changes from 1.304 to 1.269.

Figure 9:
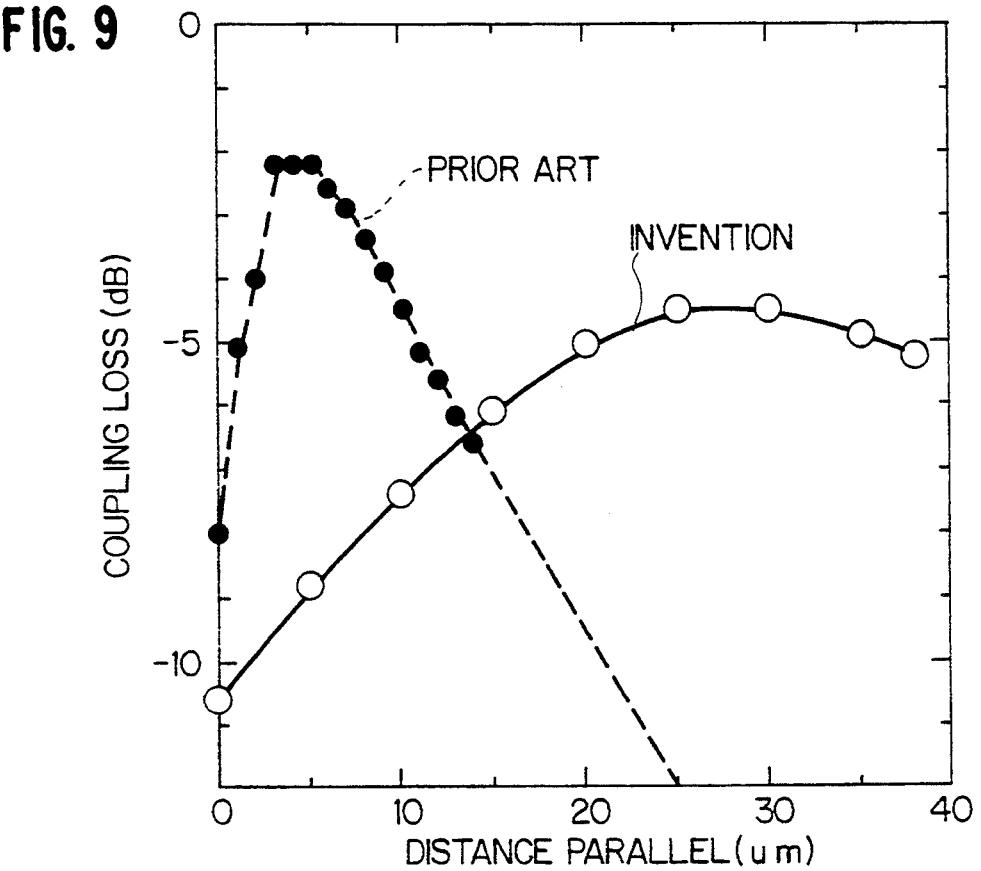
FIG. 9 is a graph comparing the equipment of the present invention and the conventional equipment with respect to a relation between the distance between the laser diode and the fiber in the direction parallel to the optical axis and the coupling loss, as determined by experiment.
Figure 10:
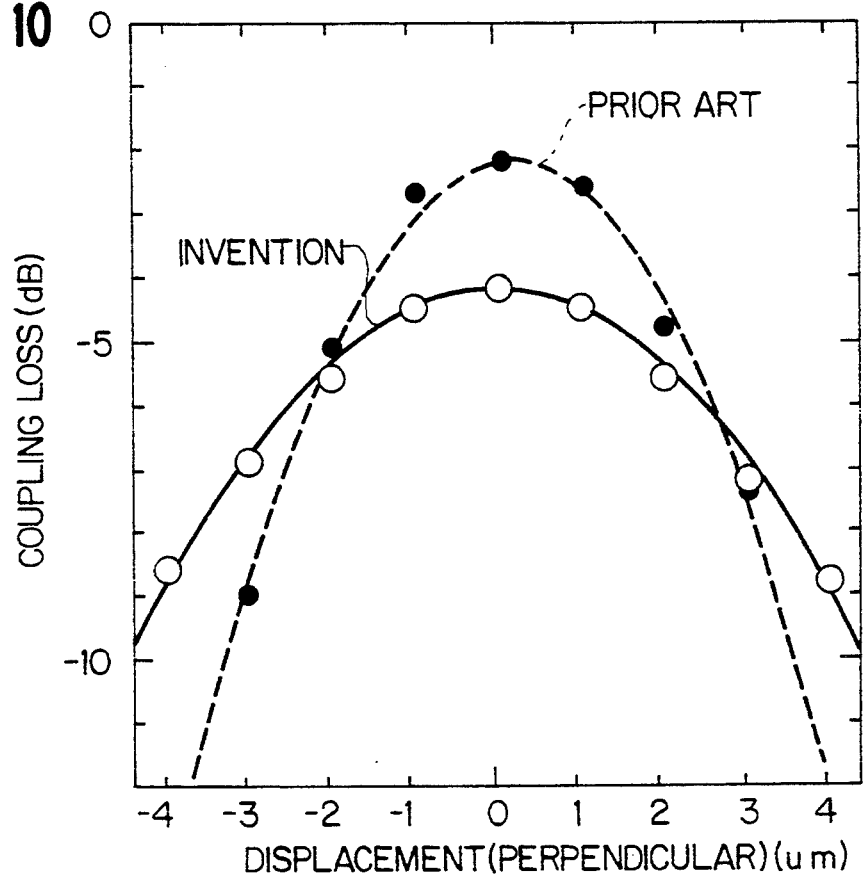
FIG. 10 is a graph comparing the equipment of the present invention and the conventional equipment with respect to a relation between the displacement of the laser diode and fiber in the direction perpendicular to the optical axis and the coupling loss, as determined by experiment.

FIG. 9 compares the equipment of the present invention and the conventional equipment with respect to a relation between the displacement of the laser diode in the direction parallel to the optical axis and the coupling loss. FIG. 10 compares them with respect to a relation between the displacement in the direction perpendicular to the optical axis and the coupling loss.

As shown in FIG. 9, when the laser diode and fiber assume a position which minimizes the coupling loss, the coupling loss of the conventional equipment is about 2 dB. By contrast, the coupling loss of the present invention is about 4.5 dB which is about 2.5 dB greater than the conventional. However, the rate of increase in coupling loss relative to the displacement of the laser diode in the direction parallel to the optical axis is greater in the conventional equipment than in the equipment of the present invention. For example, assuming a fall of coupling loss by 2 dB, a permissible displacement of about 30 μm is achievable with the laser diode of the present invention, while it is only about 5 μm in the conventional equipment.

As shown in FIG. 10, the permissible displacement available with the equipment of the present invention is greater than that of the conventional equipment even in the direction perpendicular to the optical axis. Specifically, assuming an increase in coupling loss by 2.5 dB, the equipment of the present invention achieves a permissible displacement of about ±2.5 dB, while the conventional equipment has a permissible displacement of only about ±1 μm. Presumably, why the coupling characteristic is deviated from the result of simulation is, mainly, that the convex tip of the fiber used for experiment was not completely hemispherical.

Figure 13:
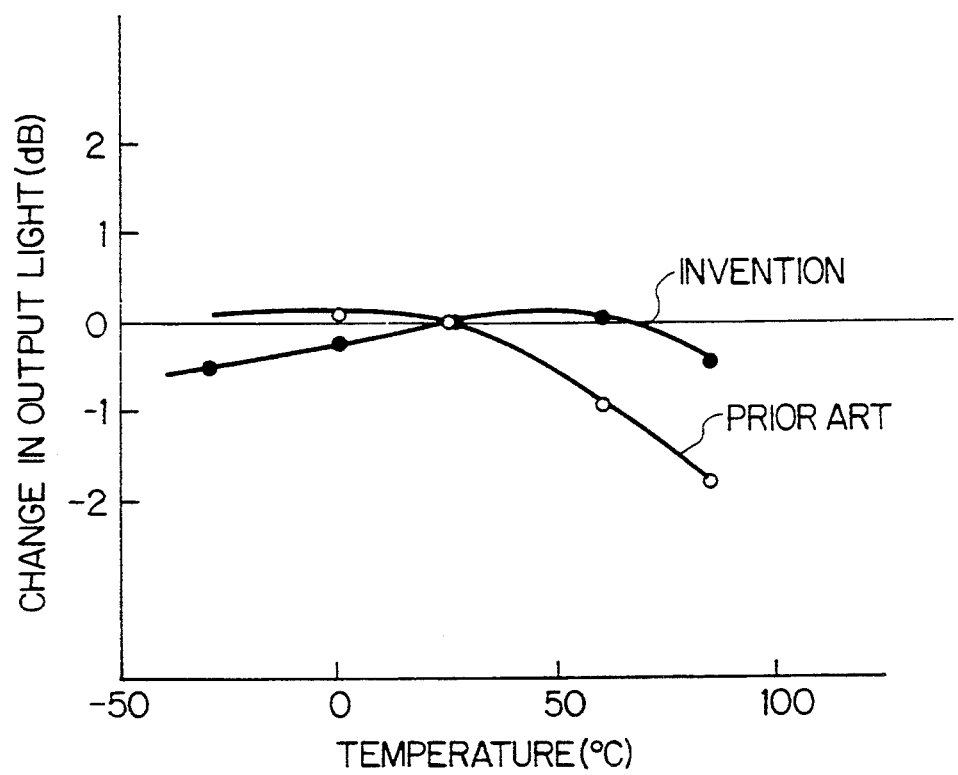
FIG. 13 is a graph comparing the equipment of the present invention and the conventional equipment with respect to a relation between the ambient temperature and the change in coupling loss, as determined by experiment.

The equipment of the present invention and the conventional equipment will be compared with respect to the stability of coupling characteristic against the varying ambient temperature. FIG. 12 shows a relation between the injection current and the light output power (I-L characteristic) of a semiconductor laser diode as determined without using the refraction index matching substrance. When implemented with the laser diode having such an I-L characteristic, the equipment of the present invention and the conventional equipment each changes the light output from the associated optical fiber in a particular manner, as shown in FIG. 13. The injection current to the laser diode was fixed at 30 mA while the ambient temperature was changed from room temperature up to 85° C. In this condition, the output light drops only about 0.5 dB in the equipment of the present invention, but it drops about 2 dB in the conventional equipment. When the ambient temperature is changed in the range of from −40° C. to +85° C., the output light changes about 0.7 dB in the equipment of the present invention, but it changes more than about 2 dB in the conventional equipment. Therefore, with the equipment of the present invention, it is possible to maintain the output light of the fiber substantially constant against the varying ambient temperature, without resorting to the control over injection current. This stems from the fact that the refraction index matching substance filling the coupling section corrects the coupling efficiency, and the fact that the substance enhances heat radiation of the laser diode to reduce the change in output light against the varying temperature. The equipment of the present invention makes it needless to control the injection current by an APC circuit since it maintains the variation of output light ascribable to ambient temperature less than 1 dB.

While the end of the optical fiber has been shown and described as being a convex tip, the present invention is practicable even with an optical fiber having a flat end.

The optical semiconductor element included in the embodiment may be replaced with a light emitting diode. Further, when the optical semiconductor element is implemented by an avalanche photodiode or similar photodetector, the refraction index matching substance reduces the difference in refraction index between the core of the fiber and the outside as well as the difference in refraction between the light-sensitive surface of the photodetector and the outside. Then, the Fresnel reflector light is reduced on the end of the fiber and the light-sensitive surface of the photodetector. As a result, the reflection light from the end and light-sensitive surface to the transmission path is reduced to prevent transmission quality from being lowered by multireflection. In addition, since the reflection loss on the end of the fiber and the light-sensitive surface is reduced, sensitivity to light is enhanced.

In summary, it will be seen that the present invention provides optical coupling equipment which eases permissible displacement accuracy requirement and, therefore, increases productivity while insuring stable optical coupling. Also, the equipment reduces the optical loss due to Fresnel reflection light on the end of an optical semiconductor element and the end of an optical fiber, thereby promoting the stable operation of a semiconductor laser diode. Moreover, the equipment can minimize the change in the output light of the fiber, which is coupled to the laser diode, without resorting to an APC circuit.

It is to be noted that the coupling equipment of the present invention can couple not only a light emitting element and an optical fiber but also a photodetector and an optical fiber. When applied to a photodetector and an optical fiber, the equipment reduces, among others, Fresnel reflector light from the end of the fiber and the light-sensitive surface of the photodetector, thereby preventing transmission quality from being degraded by multireflection.

Various modifications will become possible for those skilled in the art after receiving the teachings of the present disclosure without departing from the scope thereof.

What is claimed is:

1. Optical coupling device for optically coupling an optical semiconductor and an optical fiber having a convex tip at one end thereof comprising:

a refraction index matching substance situated to fill a space between one end of said optical semiconductor and said one end of said optical fiber facing said end of said optical semiconductor, said refractive index matching substance having a refraction index greater than 1 and smaller,than that of said optical fiber.

2. The device as claimed in claim 1, wherein said refraction index matching substance comprises a liquid.

3. The device as claimed in claim 1, wherein said refraction index matching substance comprises a gel.

4. The device as claimed in claim 1, wherein said refraction index matching substance comprises a fluoric resin.

5. The device as claimed in claim 1, wherein said refractive index matching substance has a refractive index which decreases with an increase in temperature.

6. The device as claimed in claim 5, wherein said refraction index matching substance comprises perfluorotrialkylamin.

7. The device as claim in claim 5, wherein said refractive index matching substance comprises a fluoric resin including a composition represented by a formula $(C_5F_{11})_3N$.

8. The device as claimed in claim 5, wherein said refractive index matching substance comprises a fluoric resin including a composition represented by a formula $(C_4F_9)_3N$.

9. The device as claimed in claim 5, wherein said optical semiconductor comprises a light emitting element.

10. The device as claimed in claim 5, wherein said optical semiconductor comprises a semiconductor laser diode.

11. Equipment as claimed in claim 1, wherein said optical semiconductor comprises a photodetector.

* * * * *

UNITED STATES PATENT AND TRADEMARK OFFICE
CERTIFICATE OF CORRECTION

PATENT NO. : 5,392,372
DATED : February 21, 1995
INVENTOR(S) : KAZUHIKO KURATA and HIROSHI HONMOU It is certified that error appears in the above-identified patent and that said Letters Patent is hereby corrected as shown below:

Column 1, line 68, delete "roan" and insert --to an --.

Signed and Sealed this

Thirtieth Day of May, 1995

Attest:

BRUCE LEHMAN

Attesting Officer    Commissioner of Patents and Trademarks